United States Patent

Saito et al.

[11] Patent Number: 5,309,966
[45] Date of Patent: May 10, 1994

[54] PNEUMATIC RADIAL TIRE WITH HIGH CORNERING AND STEERING STABILITY

[75] Inventors: Kenji Saito; Akira Kajikawa; Kazuo Asano, all of Kobe, Japan

[73] Assignee: Sumitomo Rubber Industries, Ltd., Kobe, Japan

[21] Appl. No.: 91,814

[22] Filed: Jul. 24, 1993

Related U.S. Application Data

[60] Division of Ser. No. 982,501, Nov. 27, 1992, which is a continuation-in-part of Ser. No. 598,390, Oct. 18, 1990, Pat. No. 5,222,537.

Foreign Application Priority Data

Oct. 19, 1989 [JP] Japan ................... 1-272460
Dec. 29, 1989 [JP] Japan ................... 1-341264

[51] Int. Cl.$^5$ .............................. B60C 3/00; B60C 3/04
[52] U.S. Cl. ................................ 152/209 R; 152/454
[58] Field of Search ............... 152/454, 209 R, 209 D, 152/538

[56] References Cited

FOREIGN PATENT DOCUMENTS 0331453  9/1989 European Pat. Off. .
0402303 12/1990 European Pat. Off. ............ 152/454
2304487 10/1976 France .
0211404  3/1990 Japan .
2198996  6/1988 United Kingdom .

Primary Examiner—Michael W. Ball
Assistant Examiner—Adrienne C. Johnstone

[57] ABSTRACT

A pneumatic radial tire has a tread surface extending along a specific curvature plane which includes a first arc with the radius R1 having a center on the tire's equatorial plane and passing through the tire's equatorial point, a second arc with the radius R2 having a center on the tire's equatorial plane and intersecting with the first arc at an intersection distant from the tire's equatorial plane by 0.2 to 0.25 times the tire width SW, and a third arc with the radius R3 passing through a ground contact outer edge point of the ground contact surface, when a standard load is applied, and a belt intermediate height point on the tread surface. In the specific curvature plane, the curvature radius ratio R2/R3 is set in a range from 4 to 12, and the curvature radius ratio R1/R2 is set in a range from 1.6 to less than 2.6 when the aspect ratio H/SW is more than 0.55 and less than 0.70. The tread surface is provided with a main circumferential groove, preferably having a groove width of 0.06 to 0.10 times the tire width SW, extending near the intersection of the first arc and the second arc in the tire circumferential direction for dividing the tread surface into the crown part and an outer shoulder part. Narrow lateral grooves crossing the tire circumferential direction divide the crown part and shoulder part into blocks.

2 Claims, 8 Drawing Sheets

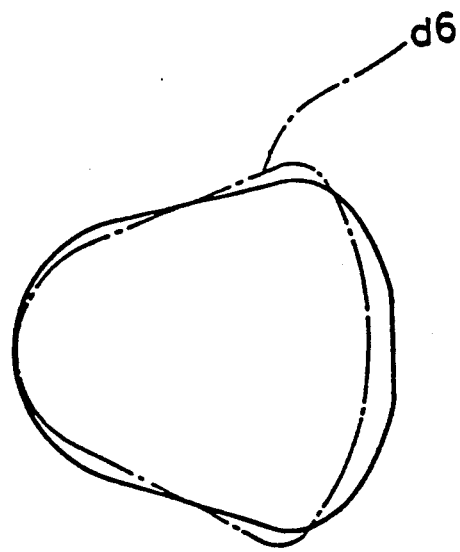

PNEUMATIC RADIAL TIRE WITH HIGH CORNERING AND STEERING STABILITY

This application is a divisional of copending application Ser. No. 07/982,501, filed on Nov. 27, 1992, which is a continuation-in-part application of Ser. No. 07/598,390 filed on Oct. 18, 1990, now U.S. Pat. No. 5,222,537 the entire contents of which are hereby incorporated by reference.

FIELD OF THE INVENTION

The present invention relates to a pneumatic radial tire improved in the cornering characteristic.

BACKGROUND OF THE INVENTION

Along with the recent trend of higher speed and higher performance of vehicles, the tires are required to have improved steering stability, especially, the straight-forward stability in high speed running, gripping performance and breakaway controllability in cornering, both on dry and wet road surfaces. And accordingly, hitherto, the double crown radius profile has been selected as the tread surface contour.

In the conventional double crown radial tire, however, although the steering wheel response and road surface gripping performance are somewhat enhanced when running straight or at the initial moment of turning, the limit performance in cornering, for example, breakaway controllability, is not improved sufficiently.

The breakaway, in this case, refers to a phenomenon that the tire skids and escapes from the cornering locus as the cornering force generated on the ground contact surface becomes insufficient against the centrifugal force by the slip angle of cornering. And this is considered to occur, as shown in FIG. 8, when the cornering force CF which has been increased approximately in proportion to the slip angle a in the small slip angle range decreases its increasing rate gradually in the large slip angle range.

SUMMARY OF THE INVENTION

It is hence a primary object of the invention to present a pneumatic radial tire capable of improving the limit performance when cornering, especially enhancing the steering stability in high speed running, by basically forming a main groove of a broad width near the intersection of the first arc and second arc while defining the tread contour profile.

According to one aspect of the present invention, a pneumatic tire comprises a carcass in radial structure extending from a tread part through side wall parts and folded at each edge around a bead core of a bead part, and belt layer composed of belt plies disposed radially outside said carcass, wherein a tread surface is formed along a specific curvature plane. The specific curvature plane includes a first arc with the radius R1 of curvature having a center on the tire's equatorial plane arc with the radius R2 of curvature having a center on the tire's equatorial plane and intersecting with said first arc at an intersection distant from the tire's equatorial plane by 0.2 to 0.25 times the tire width SW, and a third arc with the radius R3 of curvature passing through a ground contact outer edge point of the ground contact surface in the axial direction of a tire, when a standard load is applied, and a belt intermediate height point on the tread surface. The belt intermediate height point on the tread surface is defined as a point at which a tire axial direction line crosses the tread surface extending in parallel with the tire's axis from a thickness center of the belt layer at the axial outer edge of a region where the widest two belt plies overlap. Further, the tread surface is provided with a main circumferential groove extending near said intersection of the first arc and the second arc in the tire circumferential direction for dividing the tread surface into the crown part and its outer shoulder parts.

Preferably, the main circumferential groove has a groove width of 0.06 to 0.10 times the tire width SW, and narrow lateral grooves crossing the tire circumferential direction for dividing the crown part and shoulder part into blocks to divide the tread into the crown part and the shoulder part. The crown part or shoulder part may have a subsidiary circumferential groove extending in the tire circumferential direction, with a groove width of 0.1 to 0.3 times of the groove width of the main circumferential groove. On the other hand, in the specific curvature plane, a curvature radius ratio R2/R3 is set in a range from 4 to 12, and a curvature radius ratio R1/R2 is set in a range from 2.6 to 4.6 when the aspect ratio is 0.55 or less. Furthermore, a curvature radius ratio R1/R2 is set in a range from 1.6 to less than 2.6 when the aspect ratio is more than 0.55 and less than 0.70, and a curvature radius ratio R1/R2 is set in a range from 1.2 to less than 1.6 when the aspect ratio is 0.70 or more.

The tread surface is formed along the specific curvature plane having the first arc, second arc and third arc. Therefore, while improving the ground contact surface shape, in addition to the straight-forward stability in high speed running, the breakout controllability in cornering is enhanced, and the turning stability is improved.

Near the intersection of the first arc and second arc, there is a wide main circumferential groove with the groove width of 0.06 to 0.10 times the tire width SW. Therefore, disturbance of ground contact likely to occur at the intersection of arcs is eliminated, and the cornering force is increased to improve the water draining and ground contacting performances, thereby enhancing the wet brake performance. The crown part and shoulder part having blocks divided by lateral grooves increase the gripping force with the road surface so as to improve the running performance.

BRIEF DESCRIPTION OF THE DRAWINGS

An embodiment of the present invention will now be described, by way of example, referring to the attached diagrammatic drawings, in which:

FIG. 6 is a schematic drawing showing the ground contact surface shape when turning;

FIG. 7 (b) is a diagram showing the relation between the radius ratio R2/R3 and breakaway controllability.

DETAILED DESCRIPTION OF THE INVENTION

Figure 1:
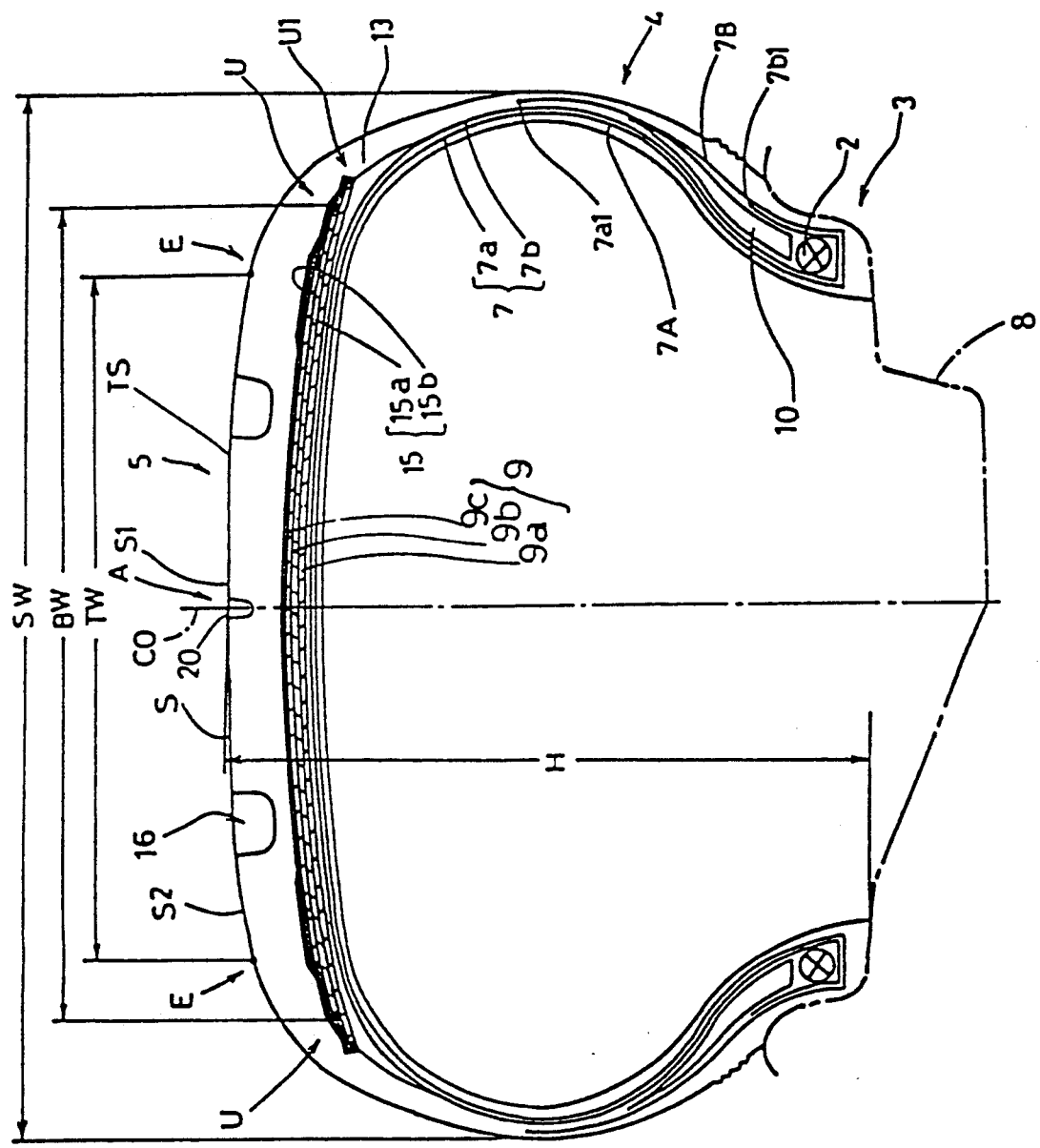
FIG. 1 is a sectional view showing an embodiment of the invention.

FIG. 1 shows an embodiment of the invention in the standard internal pressure state, mounted on a standard rim 8 and inflated with a standard internal pressure.

A pneumatic radial tire is a low aspect tire comprising a pair of bead parts 3 each having a bead core 2, side wall parts 4 extending from the bead parts 3 outwardly in the radial direction of tire, and a tread part 5 for linking between their outer ends, and in the case of the tire shown in FIG. 1, the aspect ratio H/SW of the tire sectional height H to the tire width SW is set at 0.62.

Between the bead parts 3, 3, a carcass 7 is straddling, of which both ends of the main body part 7A extending through the tread part 5 and side wall parts 4 are folded back from inside to outside around the bead core 2, and a belt layer 9 is provided on the carcass 7 and radially inward of the tread part 5.

The carcass 7 is composed of, in this embodiment, two carcass plies 7a, 7b having carcass cords, which are made of organic fiber cords such as nylon, polyester and aromatic polyamide, arranged at an angle of 70 to 90 degrees with respect to the tire equator CO. And the inside carcass ply 7a covers the folding end 7b1 of the outside carcass ply 7b, and folding end 7a1 of the inside carcass ply 7a is terminated near the maximum width position of the tire in the standard internal pressure state. Between the main body part 7A of the carcass 7 and the folding part 7B, there is a bead apex 10 extending radially from the bead core 7a in a taper form in the tire radial direction, which is made of hard rubber with JISA hardness of 65 to 90 degrees, thereby enhancing the tire lateral rigidity, together with the high turn up structure of the carcass 7.

The bead part 3 comprises known reinforcing structures including, for example, a bead filler for reinforcing the bead apex 10 together with the bead core 2, and a rim dislocation preventive chafer.

The belt layer 9 is composed of more than two belt plies which includes the two widest belt plies adjacent to each other. In this embodiment, the belt layer 9 has a three-ply structure, though more than three plies are within the scope of the invention, consisting of a first belt ply 9a, a second belt ply 9b and a third belt ply 9c which are arranged in order from carcass toward the tread surface, and the first and the second belt plies 9a, 9b are set to be widest. And the belt layer 9 along the carcass 7 has the belt width BW broader than the tire ground contact width TW so as to reinforce the tread part 5 almost over its entire width by its hoop effect. The tire ground contact width TW mentioned herein refers to the linear length between the ground contact outer edge points E, E which are points on the outer edge of the tire axial direction of the tread ground contact surface TS in the standard load state having the tire mounted on the standard rim 8, inflated with standard internal pressure, and loaded with a standard load. And the belt width BW is the linear length between the belt outer edges U, U which are axial outer edges of the belt layer where the two widest belt plies 9a, 9b overlap, in the same standard internal pressure state.

The belt width BW should be preferably in a range from 0.7 to 0.85 times of the tire width SW. More specifically, if less than 0.7 times, it results in an insufficient restraint force on the carcass 7, especially the restraint force on the overhang part of the carcass 7 projecting from the bead part 3 to outside in the tire axial direction along with the promotion of depression. This shortage of restraint force makes the ground contact pressure uneven in this area as the outside diameter increases in the radial direction of the tire in the shoulder part due to the centrifugal force and tire internal pressure along with high speed revolution.

If exceeding 0.85 times, to the contrary, the tire rigidity is excessively heightened and the riding comfort becomes poor. Therefore, the belt width BW should be preferably 0.75 to 0.85 times the tire width SW.

The belt plies 9a, 9b and 9c are composed of belt cords inclining at an angle of 10 to 30 degrees with respect to the tire circumferential direction, respectively. And the belt cords are made of high modulus cords with the initial tensile elasticity of about 2500 kg/cm 2 or higher, for example, organic fiber cords such as aromatic polyamide fibers and carbon fibers, or inorganic fiber cords such as metal fibers and glass fibers, and steel cords are used in this embodiment. Depending on requirements, cords of different materials may be used for each belt plies 9a, 9b and 9c. At the end of the belt layer 9, a soft breaker cushion 13 is placed against the carcass to alleviate the stress.

Radially outside the belt layer 9, a reinforcing band 15, which is made of organic fiber cord of relatively high strength and low mass, such as nylon cord in this embodiment, is provided so as to suppress the lifting of the belt layer 9 due to centrifugal force, etc. Meanwhile, the reinforcing band 15 is composed of a first band ply 15a which covers the outer end of the belt ply 9b to prevent separation from the outer end, and a second band ply 15b which cover the entire width of the belt layer 9 together with the first band ply 15a to improve the tread stiffness uniformly.

In the outside tread surface S of the tread part 5, a pair of main circumferential grooves 16 for dividing the tread surface S into a crown part S1 including the tire equator CO and its outer shoulder parts S2 are disposed. The grooves 16 extend linearly in the tire circumferential direction and through near the intersection H of the first arc P1 and second arc P2 forming the specific curvature plane P of the tread surface S.

Figure 4:
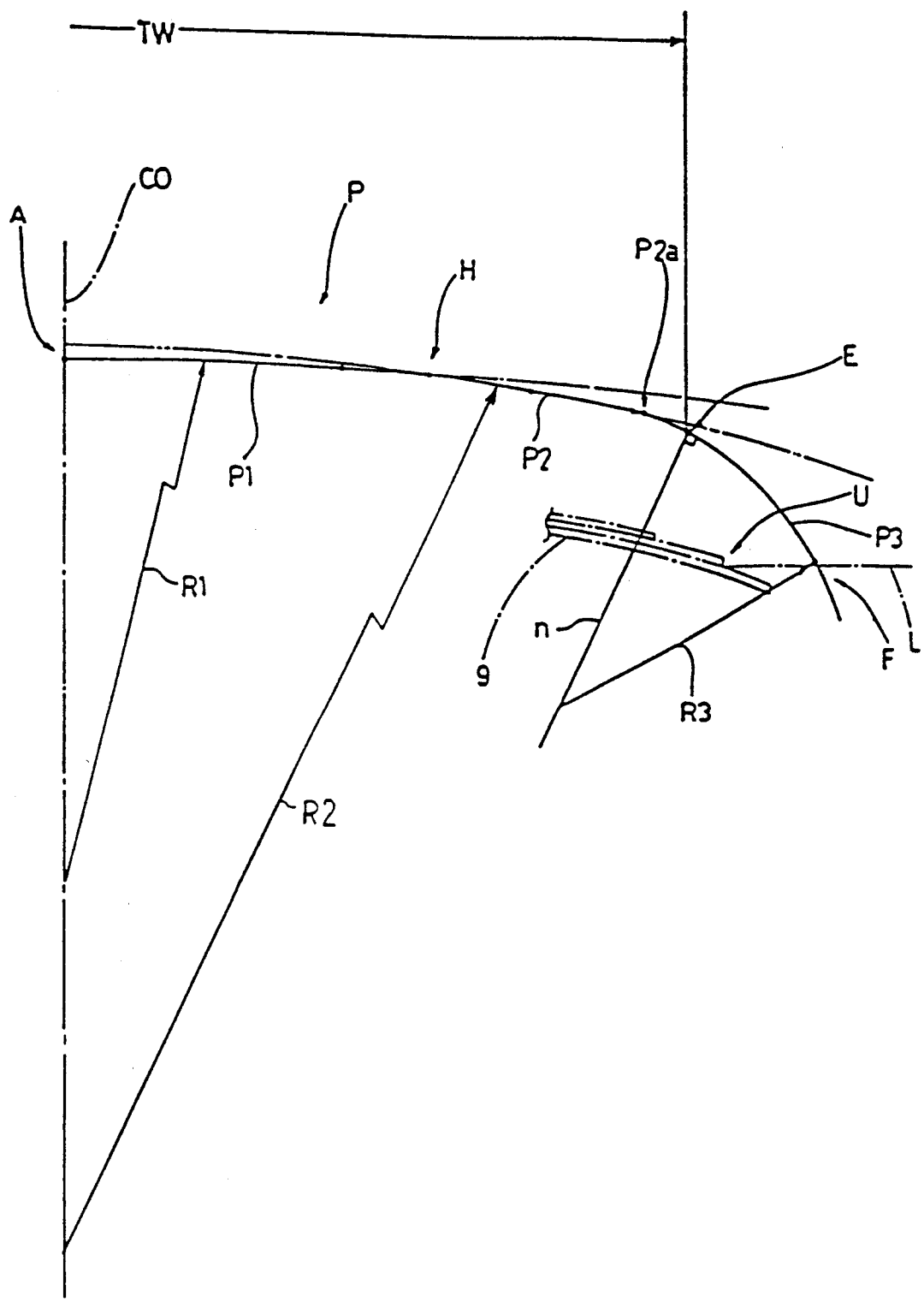
FIG. 4 is a diagram showing the specific curvature plane.

The specific curvature plane P comprises, as shown in FIG. 4, a first arc P1, a second arc P2 and a third arc P3.

The first arc P1 has the radius R1 of curvature of which center is on the tire's equatorial plane and passes through the tire's equatorial point A. The second arc P2 has the radius R2 of curvature of which center is on the tire's equatorial plane and intersects with the first arc P1 at the intersection H distant from the tire's equatorial plane by 0.2 to 0.25 times the tire width SW.

The third arc P3 has the radius R3 of curvature of which the center is on the normal line (n) set upon the tread surface S at the ground contact outer edge point E, and passes through the belt intermediate height point F and the ground contact outer edge point E. The belt intermediate height point F is the point at which a tire axial direction line L crosses the tread surface S extending parallel to the tire axis from the thickness center of the two widest plies of the belt layer 9 at the axial outer edge U of the belt layer. And this third ar P3 is smoothly contiguous to the second arc P2 through its coupling line P2a.

In this specification, meanwhile, the tire outer surface between said belt intermediate height points F, F is called the tread surface S.

Figure 2:
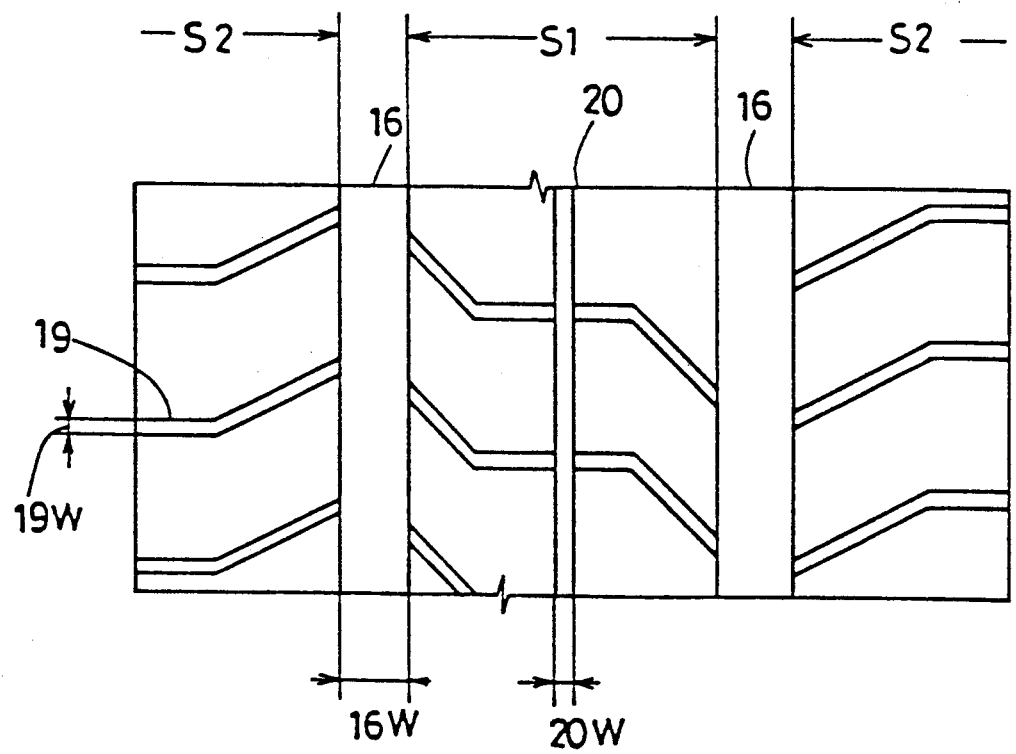
FIG. 2 is a partial flat view showing the tread groove.

The main circumferential grooves 16 extend, as shown in FIG. 2, in the tire circumferential direction near the intersection H of the first arc P1 and second arc P2. And in the crown part S1 and in the shoulder part S2, lateral grooves 19 intersecting with the main circumferential grooves 16 are disposed with specific intervals, whereby the parts S1 and S2 are divided into multiple blocks. The lateral grooves 19, in this embodiment, has narrow width 19W and geometrically folded shape.

And also, in this embodiment, in the crown part S1, there is at least one subsidiary circumferential groove 20 extending in the tire circumferential direction approximately parallel to the main circumferential grooves 16. Incidentally, the subsidiary circumferential grooves 20 may be also disposed in the shoulder part S2, or may be in both crown part S1 and shoulder part S2.

The main circumferential grooves 16 and subsidiary circumferential grooves 20 are straight grooves in this embodiment, and the groove width 16W of the main circumferential grooves 16 is broadly formed 0.06 to 0.10 times the tire width SW. As a result, the water draining effect may be enhanced while decreasing the drop of cornering force. If the groove width 16W is less than 0.06 times the tire width SW, the brake performance on the wet road is insufficient, and if exceeding 0.10 times, rail wear or other uneven wear is encouraged near the groove edge.

Meanwhile, the area "near the intersection H" is the length not more than ½ of the main circumferential groove width 16W, that is, the range in which the opening of the main circumferential grooves 16 can pass through the intersection H.

The subsidiary circumferential grooves 20 are designed to enhance the gripping performance in cornering and to keep steering stability. And for suppressing the pattern noise by relaxing the road surface impact noise of blocks, the groove width 20W is set at 0.1 to 0.3 times the groove width 16W of the main circumferential grooves 16. If less than 0.1 times, the water draining performance is insufficient. If exceeding 0.3 times, the pattern rigidity in the widthwise direction is decreased, thereby lowering the steering wheel response and breakaway controllability.

The number of subsidiary circumferential grooves should be preferably one to four, and in addition to the main circumferential grooves 19, lateral grooves 19 and subsidiary circumferential grooves 20, the tread pattern may be altered in various manners, for example, by disposing sipes and lug grooves.

Concerning the radius R1, R2 of curvature, in this embodiment in which the aspect rate H/SW is 0.62, the radius ratio R1/R2 is determined in a range from 1.6 to less than 2.6, and the radius ratio R2/R3 is in a range from 4 to 12, among the radius P1, R2, R-3 of curvature of the specific curvature plane P.

This specific curvature plane P found by the inventors is an ideal curved surface capable of enhancing the steering stability from the viewpoint of ground contact surface shape. That is, by employing the specific curvature plane P, such a ground contact surface TS as the shapes d1, d2 shown in FIG. 5 (a), (b), which is a approximately oblong rectangular shape wherein the ground contact front and rear edges e1, e2 are nearly parallel to the tire axis, can be obtained. As a result, an even ground contact pressure distribution and a high cornering force are obtained, and the steering wheel response and gripping performance when running straightly or at the beginning of turning are enhanced.

Figure 5A:
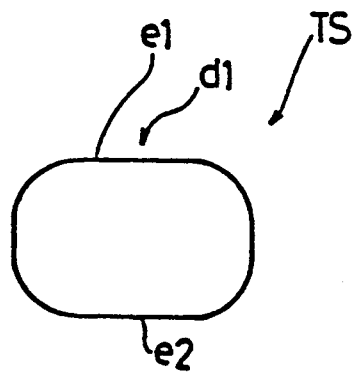
FIGS. 5 (a) to (e) are schematic drawings showing the ground contact surface shape.
Figure 5B:
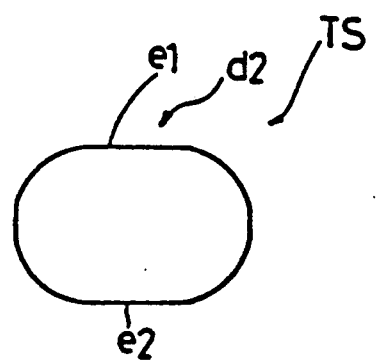
Figure 5C:
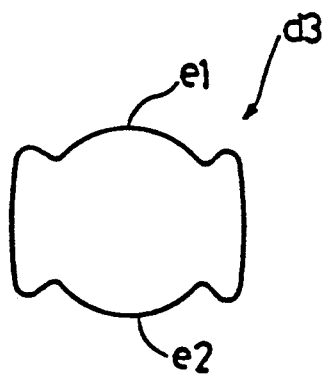
Figure 5D:
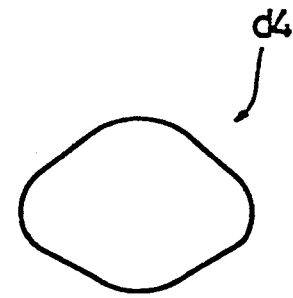
Figure 5E:
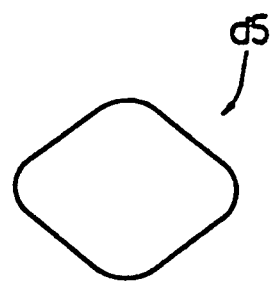

If the radius ratio R1/R2 is less than 1.6, as shown in FIG. 5(c), the ground contact length of the crown part S1 is longer than the ground contact length of the shoulder part S2, and the ground contact front and rear edges e1, e2 become curves, so that an irregular wing-shaped ground contact surface shape d3 is formed, which is inferior in the ground contact performance. If the radius ratio R1/R2 is 2.6 or more, as shown in FIG. 5(d), (e), the ground contact length of the crown part S1 becomes very long and irregular, nearly rhombic ground contact shapes d4, d5 are formed, and the ground contact performance is nonuniform, and the cornering force is lowered.

Furthermore, in the specific curvature plane P, the radius ratio R2/P3 of the second arc P2 and third arc P3 is determined in a range of 4 to 12. Therefore, when cornering, the third arc P3 which is outside the ground contact outer edge point E can be newly set on the ground, as shown in FIG. 6, as compared with the ground contact surface shape d6 in prior art. As the result, the decrease of ground contact width and increase of ground contact length are suppressed, so that the cornering force may be optimized.

Figure 7A:
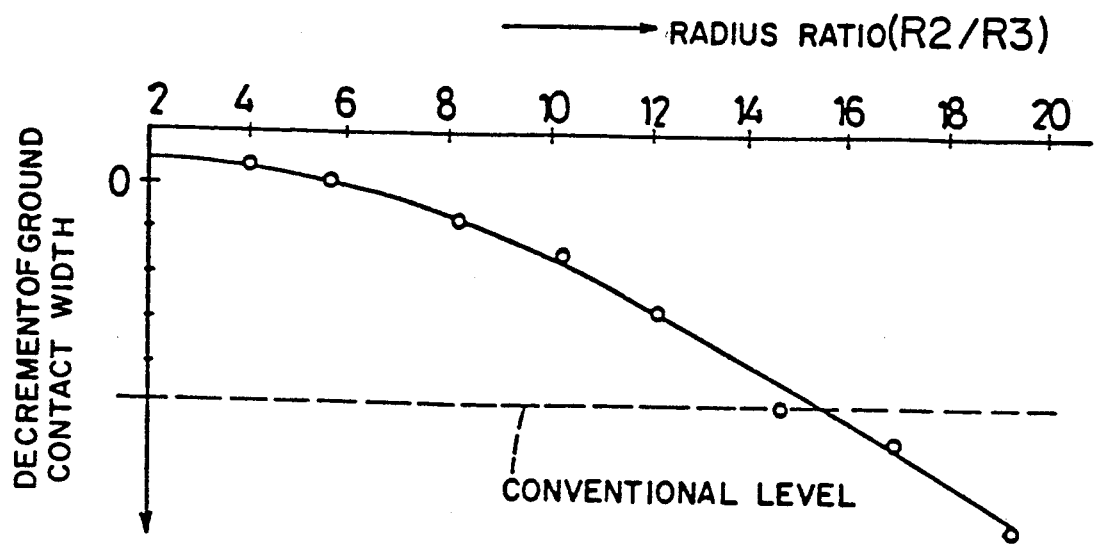
FIG. 7 (a) is a diagram showing the relation between radius ratio R2/R3 and ground contact width.
Figure 7B:
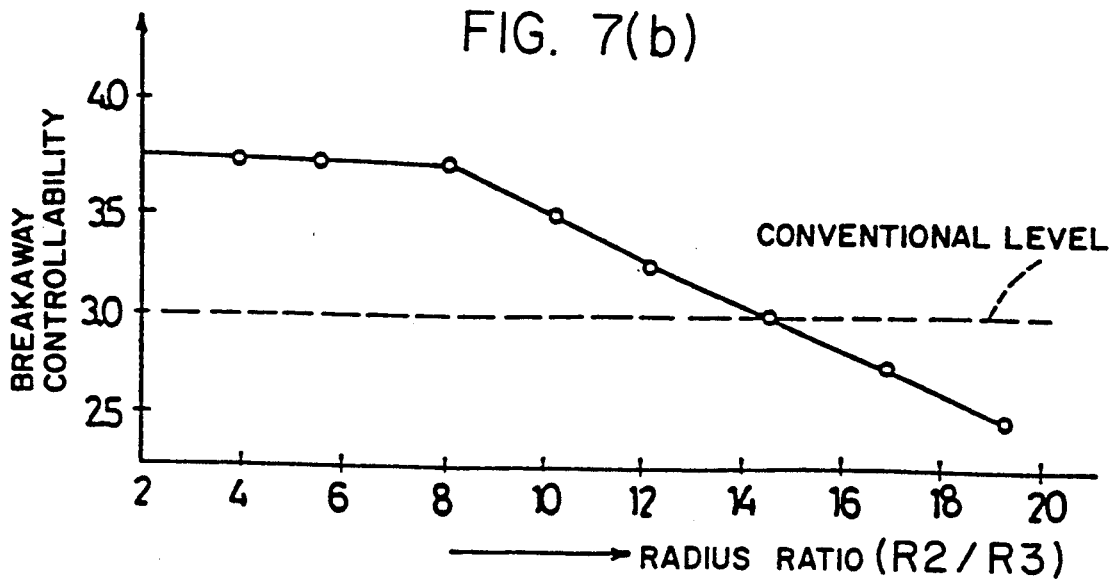
Figure 8:
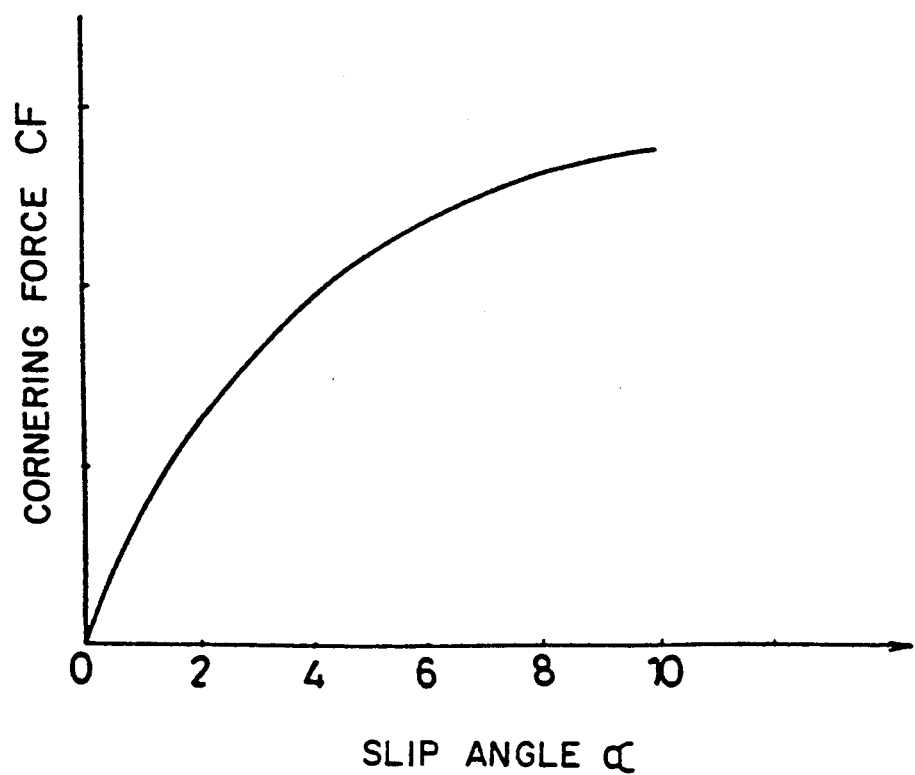
FIG. 8 is a diagram showing the relation between the cornering force and slip angle.

According to FIG. 7 (a), (b) showing the relationship of the radius ratio R2/R3 and ground contact width decrement and the breakaway controllability, so long as the radius ratio R2/R3 is in a range of 12 or less, especially 10 or less, the decrease of ground contact width can be suppressed, and the cornering force can be heightened, so that the breakaway controllability is enhanced. However, if the radius ratio R2/R3 is less than 4, the uneven wear resistance is lowered, and therefore the radius ratio R2/R3 is in a range of 4 to 12, or more preferably 6 to 10. FIG. 7 (a) shows the measurement when the slip angle is 5 degrees, and the broken line indicates the conventional level. FIG. 7 (b) shows the result of evaluation of breakaway controllability by actual vehicle feeling test, and the broken line refers to the conventional tire.

Figure 3:
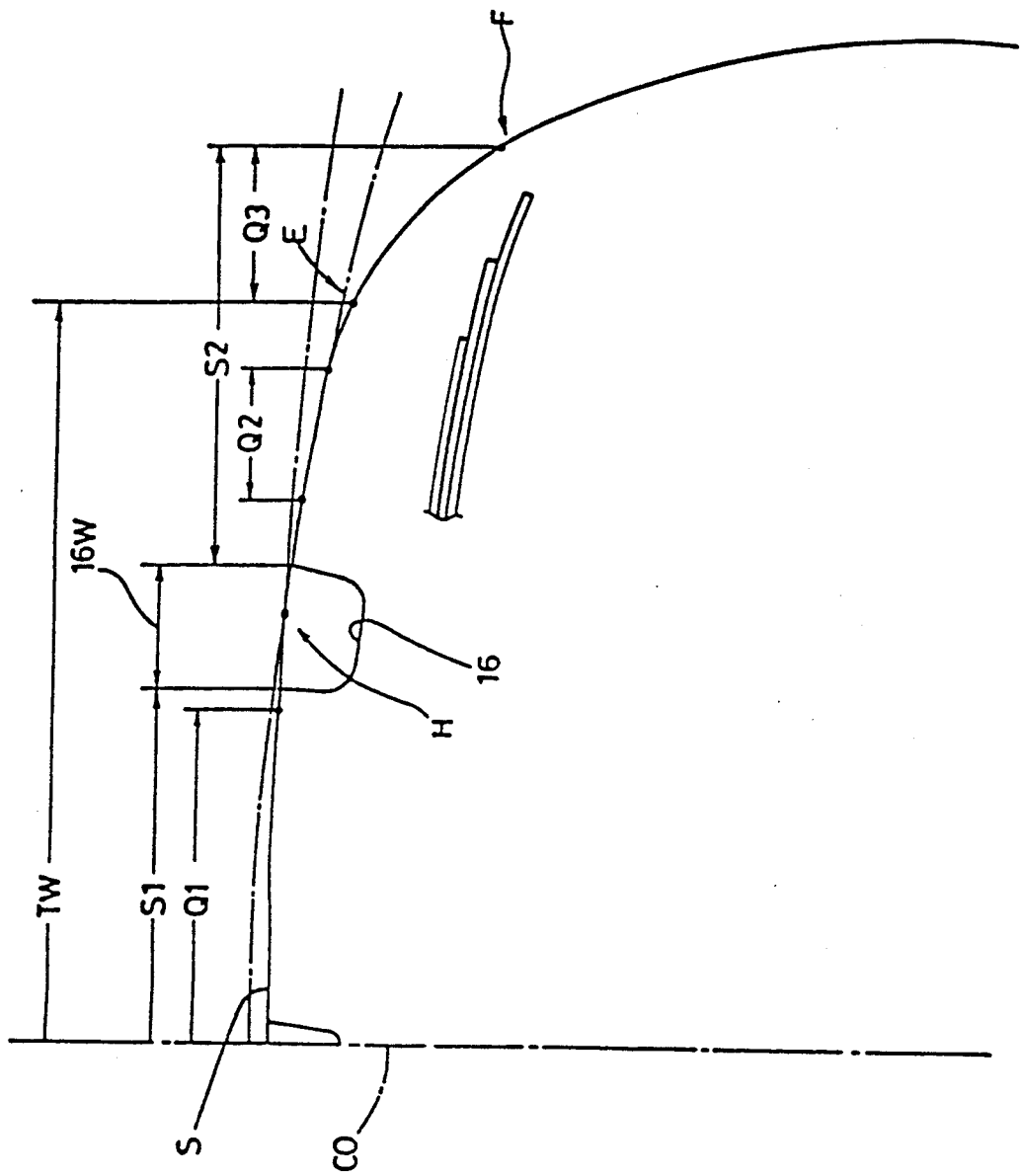
FIG. 3 is a diagram showing the contour profile of the tread surface.

In order to effectively exhibit the characteristics of this specific curvature plane P, as shown in FIG. 3, it is necessary to keep the tread surface S in contact with the specific curvature plane P, at least in a range Q1 of the length of 30% of the tire width SW around the tire's equator CO, a range Q2 distant from the tire's equator in a range of 37.5% to 45% of the tire ground contact width TW, and a range Q3 between the ground contact outer edge point E and the belt intermediate height point F. In this example, meanwhile, the main circumferential grooves 16 are disposed between the range Q1 and the range Q2, and a nearly smooth curvature surface is contiguous, including the spacing between the range Q2 and the range Q3. As a result, the tread surface S having nearly the same high steering stability performance as the specific curvature plane p is obtained. Meanwhile, the other regions than the ranges Q1, Q2, Q3 may be further set along the specific curvature plane P, or the entire surface of the tread may be formed along the specific curvature plane P.

In the relation between the aspect rate H/SW and the radius ratio R1/R2, when the aspect rate H/SW is 0.55 or less, the ratio R1/R2 is in a range from 2.6 to 4.6, when the aspect rate H/SW is in a range from more than 0.55 to less than 0.70, the ratio R1/R2 is in a range from 1.6 to less than 2.6, and when the aspect rate H/SW is 0.7 or more, the ratio R1/R2 is in a range from 1.2 to less than 1.6. And in this relation, when the slip angle is zero degrees, it is found that the ground contact surface shape can be optimized same as in FIG. 5 (a), (b) by the inventors.

This is because the deflection when the tire contacts with the ground is larger as the aspect rate H/SW of the tire is larger, that is, the tire sectional height H is larger, and therefore by setting the radius R2 of curvature closer to the radius R1 of curvature, the ground contact surface of an oblong rectangular shape with the ground contact front and rear edges approximately parallel to the tire axis may be obtained.

EXAMPLE

A tire having a structure as shown in FIG. 1 and with the size of 225/50R16 conforming to the specification in Table 1 was experimentally manufactured, and the steering stability of this tire was tested by actually driving the vehicle on both dry road surface and wet road surface to evaluate it. The results of evaluation are given in Table 1 in the five-point scoring system, in which the higher score means the higher evaluation.

Incidentally, even if the tire employing the above mentioned specific plane P has not the main grooves 16 near the intersection H, the optimal ground contact surface can be obtained, the limit performance on the dry road can be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | embodiments | | comparisons | | |
| --- | --- | --- | --- | --- | --- |
|  | 1 | 2 | 1 | 2 | 3 |
| radius ratio R1/R2 | 4.3 | 3.0 | 8.5 | 3.8 | 1.7 |
| radius ratio R2/R3 | 8.3 | 7.5 | 17.0 | 13.5 | 18.2 |
| main groove | | | | | |
| shape | linear | | | | |
| No. of grooves | 2 | 2 | 2 | none | 2 |
| groove width* | 0.09 | 0.07 | 0.05 | — | 0.13 |
| lateral groove | | | | | |
| groove width** | 0.25 | 0.25 | 0.25 | 0.25 | 0.25 |
| subsidiary groove | | | | | |
| shape | linear | | | | |
| No. of grooves | 1 | 1 | none | 1 | 1 |
| position | crown | crown | — | crown | shoulder |
| groove width** | 0.2 | 0.2 | — | 0.1 | 0.1 |
| steering stability on dry road | 3.2 | 3.5 | 2.6 | 3.0 | 2.7 |
| steering stability on wet road | 3.4 | 3.3 | 3.0 | 2.5 | 2.5 |

TABLE 1-continued

|  | embodiments | | comparisons | | |
| --- | --- | --- | --- | --- | --- |
|  | 1 | 2 | 1 | 2 | 3 |

*The groove width is expressed as the ratio to the tire width.
**The groove width is expressed as the ratio to the main groove width.

What is claimed is:

1. A pneumatic tire comprising a carcass in radical structure extending from a tread part through side wall parts and folded at each edge around a bead core of a bead part, and a belt layer composed of more than two belt plies disposed radially outside said carcass, said belt layer having a pair of axial outer edges, each of said pair of axial outer edges being defined where the two widest belt plies overlap, wherein;

a tread surface is formed along a specific curvature plane which includes a first arc with the curvature radius R1 having a center on the tire's equatorial plane and passing through the tire's equatorial point, a second arc with the curvature radius R2 having a center on the tire's equatorial plane and intersecting with said first arc at an intersection distance from the tire's equatorial plane by 0.2 to 0.25 times the tire width SW, and a third arc with the curvature radius R3 passing through a ground contact outer edge point of the ground contact surface in the axial direction of a tire when a standard load is applied and a belt intermediate height point on the tread surface, said belt intermediate height point on the tread surface being defined as a point at which a tire axial direction line crosses the tread surface extending in parallel with the tire's axis from a thickness center of one of said pair of axial outer edges; and the tread surface is provided with a pair of main circumferential grooves, one of said main circumferential grooves extending on each side of the tire's equatorial plane at said intersection of the first arc and the second arc in the tire circumferential direction for dividing the tread surface into a crown part and an outer shoulder part, each said main circumferential groove having a groove width of 0.06 to 0.10 times the tire width SW, and with a plurality of narrow lateral grooves crossing the tire circumferential direction for dividing the crown part and the shoulder parts into a plurality of blocks, wherein the specific curvature plane has a curvature radius ratio R2/R3 in a range from 4 to 12, and a curvature radius ratio R1/R2 in a range from 1.6 to less than 2.6 when the aspect ratio H/SW of the tire sectional height H to the tire width SW is more than 0.55 and less than 0.70.

2. The pneumatic radial tire according to claim 1, wherein the crown part or the shoulder part has a subsidiary circumferential groove extending in the tire circumferential direction, with a groove width of 0.1 to 0.3 times the groove width of said main circumferential groove.

* * * * *